Sept. 16, 1958        H. R. NOON        2,852,722
ELECTRIC RECTIFIERS EMPLOYING SEMI-CONDUCTORS
Filed July 30, 1956
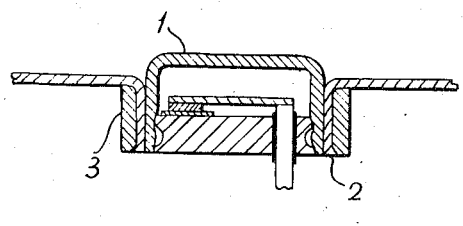
Inventor
Harry Roy Noon
By Miles D. Pillars
Atty.

United States Patent Office 2,852,722
Patented Sept. 16, 1958

2,852,722

ELECTRIC RECTIFIERS EMPLOYING SEMI-CONDUCTORS

Harry Roy Noon, Rugby, England, assignor to The British Thomson-Houston Company Limited, London, England, a British company Application July 30, 1956, Serial No. 600,874

Claims priority, application Great Britain August 9, 1955

2 Claims. (Cl. 317—234)

This invention relates to electric rectifiers employing semi-conductors as the rectifying element. In constructing electric rectifiers of the above type, it is essential, inter alia, to provide the rectifying element with an hermetically sealed casing to obviate the deleterious effects of atmospheric conditions on the rectifying element, and to ensure that an undue rise in temperature of the rectifying element does not occur either during manufacture or operation. It is also desirable to reduce to a minimum the number of seals required to complete the enclosure of the element in its casing.

The maintenance of cool running conditions for the rectifying element requires, in general, that a heat radiating surface be provided in heat exchange relation with the electrically conducting base member on which the element is mounted.

The object of the present invention is to provide a construction of sealed rectifier which satisfies all the above requirements.

According to the invention in one of its aspects the major portion of the wall of the envelope for enclosing a rectifying element is formed integrally with a heat radiating member by producing a depression in the radiating member, the rectifying element mounted with its co-operating contact upon a base member being sealed into the depression so that the rim of the base member is in contact with the rim of the depression.

According to the invention in another of its aspects the rectifying element is first placed within a sealed capsule and the capsule is then mounted in good heat exchange relationship with a heat radiating member.

Preferably the co-operating contact is led insulatingly through the base member. By this means, the rectifying element, mounted on its base, constitutes an integral part of the unit and may be tested after assembly and before being sealed into the depression in the radiating member. The final assembly of the unit thus involves only the step of sealing the base member into the depression in the radiating member. Alternatively the lead to the co-operating contact to the rectifying element may be passed through an aperture suitably lined with insulation in the depression in the radiating member when the base member is assembled with the radiating member, the lead being subsequently hermetically sealed in the insulation lining the aperture. Such a construction, however, involves a further step in the assembly of the rectifier which may well disturb the co-operating contact, thereby necessitating a further testing after assembly has been completed. This is obviously less desirable than the construction in which the tested rectifier unit is assembled into the depression in a manner which involves no disturbance of the co-operating contact.

The sealing of the base member to the rim of the depression in the radiating member which is to form the wall of the envelope for the rectifier is preferably effected by a process involving no application of heat. This may be obtained by coating the faces of the base member and the rim of the depression which are to be joined with a sealing metal of relatively low melting point, such as indium, or a suitable sealing compound may also be used, and applying pressure between the parts to be joined, in a manner to cause plastic flow of the sealing metal at the joint interface. To this end, the base member which is preferably of circular cross-section, is made to form a press fit into the rim of the depression in the radiating member, so that when the base member is forced into the depression, plastic flow of the sealing metal takes place.

In order to strengthen the metal at the rim of the depression in the radiating member, a metal collar may be placed around the depression, whilst the pressing of the base into position is being effected.

Alternatively the base may be a sliding fit in the inside of the rim of the depression and the metal collar an interference fit with the outside of the depression. When this alternative is adopted the base is supported in the rim of the depression while the collar is pressed over the outside. The metal of the collar is stronger than that of the radiating member and causes distortion of the radiating member which is pressed into intimate contact with the base. Metal from the radiating member can be made to extrude into grooves in the base, which adds to the mechanical strength of the assembly. Sealing compound located in these grooves is trapped under pressure by the metal extruding into the grooves.

The invention may be better understood from the description of one embodiment in which a depression in the heat radiating member forms part of the enclosure of the rectifying element and from the description of another embodiment illustrated by the single figure of the accompanying drawing which shows a rectifying element formed as a sealed unit mounted in a depression or recess in the heat radiating member.

In one construction more suitable for radiating members of thinner metal a radiating member may consist of a sheet of metal of good heat conducting properties, e. g. copper. The radiating member is formed by drawing a depression of circular shape, the base of which is flat and parallel with the remainder of the sheet, and the sides of which extend normal to the plane of the sheet. The internal diameter of the depression is made equal to the external diameter of the base member.

In the preferred construction more suitable for radiating members of thicker metal a separate cup is formed (1) similar in shape to the depression in the radiating member previously described. The radiating member has an annular flange normal to its plane drawn from a circular hole (2). The inside diameter of this flange is slightly less than the outside diameter of the cup before assembling the parts together. The metal collar (3) is fitted to the flange on the radiating member.

The base member may consist of a disc of metal having good heat conducting properties, e. g. copper. On one face of the disc is located the rectifying element of semi-conducting material, such as silicon or germanium, which is soldered to the base with a low melting point solder. The base is provided with an aperture off-set from the centre of the base, through which is passed a conductor which is to form the co-operating contact to the rectifying element, the conductor being insulated from the base member by a glass-to-metal, or ceramic-to-metal seal. The conductor after passing through the seal, is bent over to lie substantially parallel to the base member and at its end is made to contact with the rectifying element through the intermediary of a barrier layer junction. The contact is preferably formed by a blob of metal which, when fused to the surface of the rectifying element, will form a P. N. junction with the rectifying element. The technique for producing such junctions is well-known, indium being a suitable metal for diffusion into the surface of a semi-conducting element of germanium.

After the base member with its pre-formed rectifying junction has been completed, the unit may be tested prior to its being inserted into the depression in the radiating member. The completed element will thus consist of the radiation member which constitutes one terminal of the rectifying element and the terminal lead passing through the insulated seal through the base member. A number of such elements may be mounted between parallel terminal plates of insulating material, to form a rectifying assembly, the terminal plates being spaced apart by the radiating members which are flanged over at their ends for securement to the terminal plates. The arrangement of the insulated contacts on adjacent rectifying elements will be such as to facilitate connection between the adjacent elements.

What I claim is:

1. A semi-conductor rectifier device comprising a semi-conductor unit and a heat radiator thermally associated with said unit, said semi-conductor unit consisting of a metal cup, a metal base member sealed at its rim to the inner periphery of the wall of said metal cup, a rectifying element of semi-conducting material secured with one face in electrical contact with the face of said base member within said cup, and a conductor passing insulatingly through an aperture in said base member and contacting the other face of said element through a rectifying junction with said element, and said heat radiator consisting of a metal sheet having an aperture therein, the rim of said aperture being formed with an annular flange projecting normal to the surface of said sheet, and said semi-conductor unit being secured within said aperture with the outer periphery of said cup in intimate contact with said annular flange.

2. A semi-conductor rectifier device comprising a semi-conductor unit and a heat radiator thermally associated with said unit, said semi-conductor unit consisting of a metal cup, a metal base member sealed at its rim to the inner periphery of the wall of said metal cup, a rectifying element of semi-conducting material soldered to the face of said base member within said cup, and an electrical conductor insulatingly sealed through an aperture in said base member displaced from said element, said conductor being bent within said cup and having its end secured to the exposed face of said element through a rectifying junction with said element and said heat radiator consisting of a metal sheet having an aperture therein, the rim of said aperture being formed with an annular flange projecting normal to the surface of said sheet, and said semi-conductor unit being secured within said aperture with the outer periphery of said cup in intimate contact with said annular flange.

References Cited in the file of this patent

UNITED STATES PATENTS 2,763,822    Frola et al. _____ Sept. 18, 1956